UNITED STATES PATENT OFFICE.

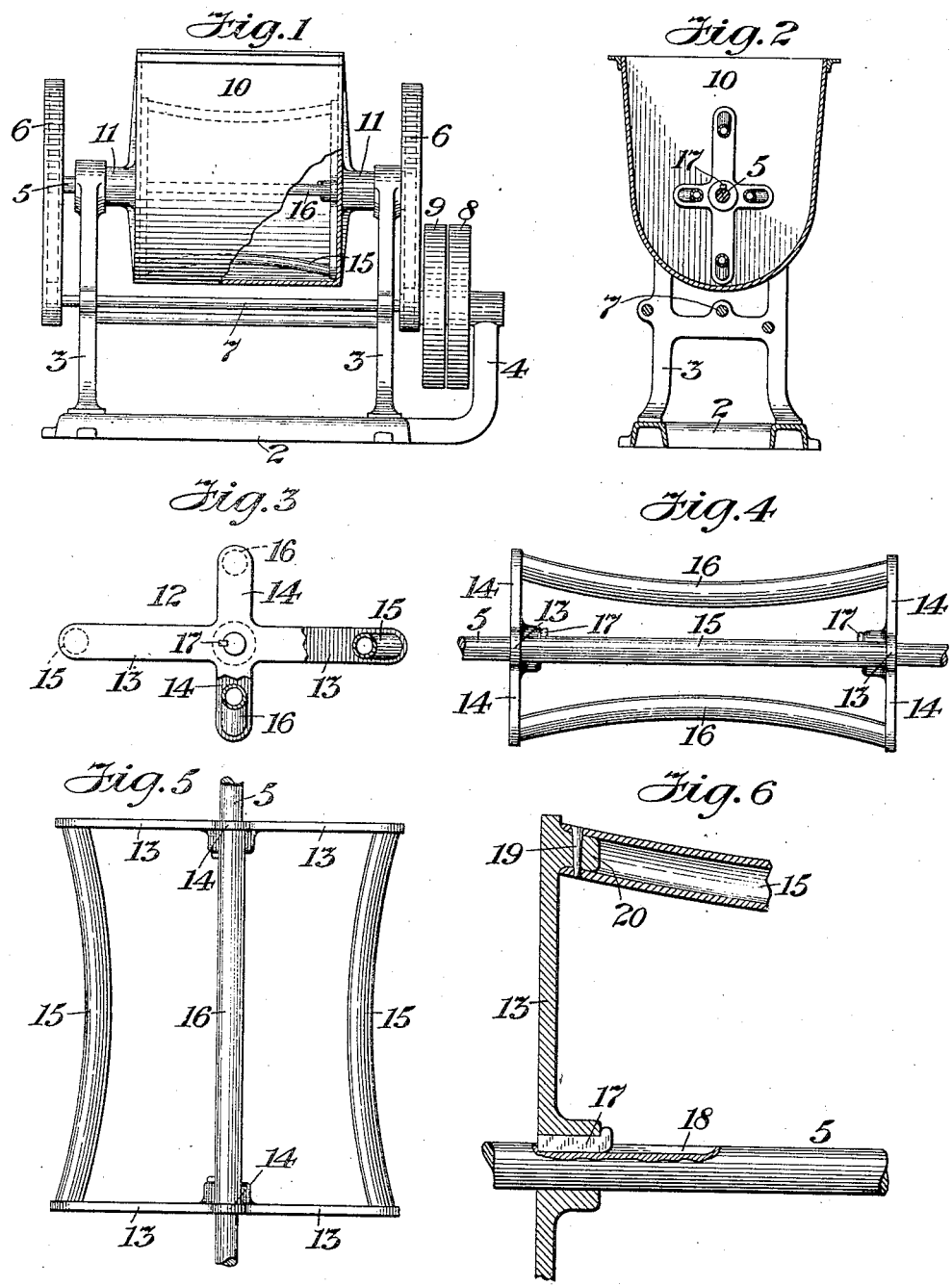

WALTER J. TRAVIS, OF YONKERS, NEW YORK.

DOUGH MIXING AND KNEADING MACHINE.

1,041,908.   Specification of Letters Patent.   Patented Oct. 22, 1912.

Application filed January 13, 1912. Serial No. 671,006.

*To all whom it may concern:*

Be it known that I, WALTER J. TRAVIS, citizen of the United States, and resident of Yonkers, in the county of Westchester and State of New York, have invented certain new and useful Improvements in Dough Mixing and Kneading Machines, of which the following is a specification.

This invention relates to a machine for mixing and kneading dough, and the main object of the invention is to provide an improved and simple machine of this general class by means of which the constituents from which the dough is made may be thoroughly mixed and the dough itself properly kneaded and pulled or drawn out to aerate and work up into a substantially homogeneous body the maximum amount of gluten in the dough. In order to accomplish these results a kneading-trough is provided in which is mounted a rotary dasher which differs from others heretofore used for the same purpose in that the dasher is so constructed as to present to the dough mixing and kneading arms or blades the outer working edges of which, that is, the edges farthest away from the axis of rotation of the dasher, are concave for the purpose of working the mass of dough inward from both ends of the trough toward the central vertical plane of rotation of the dasher, in order that the whole mass of dough may be most thoroughly acted upon and the maximum kneading and pulling or drawing out of all portions of the same effected.

Other features of the invention not hereinbefore referred to will be hereinafter described and claimed and are illustrated in the accompanying drawings, in which, Figure 1 is an elevation of the mixing and kneading machine embodying the invention, part of the trough being broken away to show the construction and mounting of the dasher; Fig. 2 is a substantially central, vertical, transverse section of the same; Fig. 3 is an enlarged end elevation of the rotary dasher of the machine with parts broken away to show the construction more clearly; Fig. 4 is a side elevation of the same looking in the direction of the long transverse axis of the dasher; Fig. 5 is a similar view of the same looking in the direction of the short transverse axis of the dasher, that is, at an angle differing by 90° from that shown in Fig. 4, and Fig. 6 is an enlarged sectional detail illustrating the construction and mode of connecting the various elements of the dasher.

Similar characters designate like parts in all the figures of the drawings.

The frame-work of a machine embodying the present invention may be of any suitable construction, but preferably is substantially the same as that shown in Figs. 1 and 2, in which 2 designates a bed or base-plate from which rise, near opposite ends thereof, two vertical end frames, 3—3, preferably of like construction, and a shorter vertical riser, such as 4, by which suitable driving means for transmitting power may be supported. The two end frames 3—3 are suitably connected and braced both lengthwise and crosswise of the machine to obtain a stiff frame-work. Any suitable means may also be employed for applying power to the rotary element of a kneading machine embodying the invention. In the present case the principal rotary driven element is a shaft, 5, which is journaled in bearings at the upper ends of the vertical frames 3—3, and at its opposite ends has secured thereto large gear-wheels, preferably spur-gears, which are inclosed in gear-cases, 6—6, for the purpose of protecting the operators from injury. The same gear-cases also inclose, in this contsruction, smaller gear-wheels or pinions which mesh with the upper gear-wheels just described, and are carried at the ends of a shaft, 7, also suitably journaled in bearings in the uprights 3—3. At the right-hand end of the shaft 7 to which the two driving spur-pinions just referred to are secured, are located between the corresponding gear-case 6 and the riser, 4, fast and loose pulleys, such as 8 and 9, for starting and stopping the machine in a well-known manner. By means of this construction it will be seen that the machine may be readily started and stopped, and that when in operation power is applied to both ends of the dasher-carrying shaft. It will also be seen that the rapid rotation of the driving-pinions is converted into the proper, slow rotation of the larger gears by means of which the dasher is directly operated.

The principal elements of the machine for effecting the mixing and kneading of the dough are, as usual, a receptacle or trough and a dasher, one of which, in this case the dasher, is rotatable relatively to the other. The kneading trough employed in the present machine is indicated at 10. As shown, it is a receptacle having an open upper end for the reception of the dough-making materials, or constituents, and a bottom portion, preferably substantially semi-circular in cross-section in order that it may coöperate most advantageously with the arms or blades of the dasher, which arms or blades will preferably travel in circular paths about the axis of the shaft 5. This kneading-trough 10 is suitably mounted with its longitudinal axis concentric with that of the shaft 5, it having trunnions 11—11, extending therefrom for this purpose. The dasher may also be of any suitable construction provided it coöperates with the mixing and kneading trough in the manner before stated. It is here shown as rotary and as comprising a plurality of elements, to wit, end-pieces and longitudinal blades or rods connected thereto, the whole constituting preferably a skeleton dasher. The end-pieces may be of any suitable construction, but preferably of the type illustrated at 12. Here they are shown as four-armed spiders, 12, each of said spiders comprising two long arms, 13, in line with each other, and two short arms, 14, also in line with each other and disposed at right angles to the long arms 13. These two end-pieces 12 are connected in this case, as is usual, by arms or blades constituting the principal mixing and kneading elements coöperative with the trough. Here, however, these arms or blades are not straight members disposed in parallelism with the axis 5 of the dasher, but are curved elements, that is to say, they present outer curved surfaces which are concave. Here these concave working edges are the edges of rods, such as 15 and 16, these rods being preferably tubular ones. Here some of said rods are disposed at different distances from the axis of rotation of the dasher than others, they being preferably arranged in pairs. In the particular construction illustrated, these pairs of blades or rods are disposed oppositely to each other and also at a right angle to the arms of the other pair, as are the spider-arms of the end-pieces 12. Each of the kneading and mixing blades or rods shown, is or may be identical in structure with every other, but the functions of the two pairs of rods are different. The rods disposed nearest the axis of the dasher are incapable of effecting as thorough a kneading of the dough as are the other two rods or blades 15, but they serve to mix the materials thoroughly and to effect a partial kneading of the dough and also, and primarily, act as a means for pulling or drawing out the dough and aerating it. It will be clear that because of their location they have a different action upon the dough from that of the two rods 16 and that that portion of the mass of dough that is raised by the rotation of the dasher and tumbled upon the rods 16 is pulled and drawn out in a manner that would not be possible with a dasher consisting of a set of blades or rods all equidistant from such axis. The curved form of the blades also facilitates this pulling out or drawing out of the dough lengthwise and consequently assists in the working up into a substantially homogeneous body the gluten in the mass. The principal function, however, of the concave outer working edges of the respective rods is to knead the dough and force and roll it toward the longitudinal center of the trough in the zone of the principal mixing, kneading and pulling action. These rods 15 are disposed close to the bottom wall of the trough and revolve in the trough in close proximity thereto, especially at their ends, so that there is just sufficient room to permit clearance.

It will be seen that whether the dasher is viewed in side elevation in the direction of its short, transverse axis, or its long transverse axis, it is in cross-section a concavo-concave structure and consequently acts to roll the general mass of dough toward the center of the machine and away from the ends of the trough. In this case the end-pieces or spiders of the dasher are shown as secured to the shaft by suitable keys, such as 17, inserted in key-ways, such as 18, milled in the shaft 7, while the rods at their ends are connected to the spider-arms, preferably by means of pins or rivets, such as 19, driven through corresponding transverse openings in the ends of the rods or tubes and through similar openings in portions of the spider-arms, such for example, as bosses, 20. (See Fig. 6.) The pins or rivets 19 are, of course, headed up after being driven into place. Any other suitable means may be used for connecting the parts just described, but that just set forth is a simple and effective means of connecting the various elements of the dasher substantially rigidly, and securing the dasher as a whole firmly to the shaft 5.

What I claim is:

1. In a machine of the class specified, the combination of a trough having a wall a portion of which is substantially circular, a rotary dasher mounted in said trough and having a general position coaxial with the general position of said trough at the axial center of curvature of the wall thereof, said dasher having a number of blades each provided with a concave edge substantially parallel to the axis of the dasher, and the several concave edges being arranged in direct succession and together forming with the wall of the trough a dough opening having a gradually increasing volume from the ends to the center of said dasher, said concave edges coacting with said walls for forcing the dough toward the central plane of rotation of said dasher.

2. In a machine of the class described, the combination of a trough provided with a wall a portion of which has a cylindrical curve, a revoluble dasher mounted in said trough and having its axis of rotation substantially coincident in position with the axial center of the curved portion of said wall, said dasher being provided with blades spaced at different distances from its own axis and having concave outer surfaces arranged in direct order of succession, said outer surfaces and the curved portion of said trough together forming an opening having a gradually increasing volume from the ends to the middle of said dasher for forcing a plastic material toward the central plane of rotation of said dasher.

Signed at New York, in the county of New York, and State of New York, this 9th day of January, A. D. 1912.

WALTER J. TRAVIS.

Witnesses:
CHAS. F. DANE,
K. M. CASSIDY.